United States Patent
Izumi et al.

[11] Patent Number: 6,156,456
[45] Date of Patent: Dec. 5, 2000

[54] POSITIVE ELECTRODE ACTIVE MATERIAL FOR ALKALINE STORAGE BATTERY

[75] Inventors: Yoichi Izumi, Moriguchi; Hiroyuki Sakamoto; Hidekatsu Izumi, both of Neyagawa; Isao Matsumoto, Osaka, all of Japan

[73] Assignee: Matsushita Electric Industrial Co., Ltd., Osaka, Japan

[21] Appl. No.: 09/129,959

[22] Filed: Aug. 6, 1998

[30] Foreign Application Priority Data

Jan. 23, 1998 [JP] Japan ................................ 10-011071

[51] Int. Cl.⁷ .............................. H01M 4/32; H01M 4/50
[52] U.S. Cl. .......................... 429/223; 429/224; 423/594; 423/599
[58] Field of Search .................... 429/223, 224; 423/594, 599

[56] References Cited

U.S. PATENT DOCUMENTS 5,348,822  9/1994  Ovshinsky et al. ..................... 429/223

FOREIGN PATENT DOCUMENTS

| | | |
|---|---|---|
| 51-122737 | 10/1976 | Japan . |
| 61-101958 | 5/1986 | Japan . |
| 61-104565 | 5/1986 | Japan . |
| 4179056 | 6/1992 | Japan . |
| 8222215 | 8/1996 | Japan . |
| 8222216 | 8/1996 | Japan . |
| 8225328 | 9/1996 | Japan . |

OTHER PUBLICATIONS

Harivel et al. "Structure and Electrochemical Properties of Nickel Hydroxides" Power Source (1966), pp. 239–255.

*Primary Examiner*—Laura Weiner
*Attorney, Agent, or Firm*—Stevens, Davis, Miller & Mosher, L.L.P.

[57] ABSTRACT

A positive electrode active material, includes a $\beta$-Ni(OH)$_2$ type nickel oxide (including hydroxide) containing Mn in the state of solid solution or coprecipitated state with an average valence of Mn being 3.3 valences or more and preferably with a ratio A2/A1 being 1.25 or less which is a ratio of integrated intensity A2 of a peak present at $2\theta=18-21°$ to integrated intensity A1 of a peak present at $2\theta=37-40°$ of powder X-ray diffraction using CuK$\alpha$ ray.

18 Claims, 4 Drawing Sheets

POSITIVE ELECTRODE ACTIVE MATERIAL FOR ALKALINE STORAGE BATTERY

BACKGROUND OF THE INVENTION

1. Field of the Invention

The present invention relates to the improvement of alkaline storage batteries which use nickel hydroxide for the positive electrode.

2. Description of the Related Art

Alkaline storage batteries widely used for electric sources of various portable apparatuses include nickel-cadmium storage batteries, nickel-metal hydride storage batteries and the like.

Hitherto, many inventions and proposals have been made on nickel hydroxide which is commonly used for the positive electrode of these alkaline storage batteries and plays an important role, and improvements have been made from various view points (for example, improvement of high-temperature charge efficiency, improvement of utilization factor and prolongation of cycle life). Specifically, mention may be made of addition of conductive agent powder (especially, Co, Co compounds, Ni, carbon and the like) for effective utilization of charge-discharge characteristics of nickel hydroxide powder and design of substrates for current collection. Furthermore, various proposals have been made on improvement of nickel hydroxide per se.

With regard to the improvement of nickel hydroxide per se, as a relatively old proposal, Mg, Mn, Zn, Pb, Ba, Fe, rare earth elements are dissolved in nickel hydroxide to form a solid solution as reported in "Power Source" (1966), pp239–255. However, no advantage as a positive electrode active material for alkaline storage batteries is mentioned there on the dissolution of Mn as solid solution. JP-A-51-122737 proposes a process of precipitating a hydroxide by reacting a mixed aqueous solution of nickel and a salt of metal other than nickel with an aqueous alkaline solution as a measure to simplify the steps and reduce the production cost. As relatively new proposals, JP-A-61-101958 proposes dissolution of Co as solid solution and JP-A-61-104565 proposes dissolution of Cd as solid solution for the improvement of utilization factor of active materials in high-temperature atmosphere. Moreover, JP-A-4-179056 proposes to dissolve Mn or the like in nickel hydroxide to form a solid solution as a method for improving cycle life characteristics. In this method, charge-discharge reaction of active material is basically a one-electron reaction between $\beta$-Ni(OH)$_2$ and $\beta$-NiOOH. Therefore, these techniques do not directly contribute to the improvement of capacity density of batteries. In addition, JP-A-8-222215 and JP-A-8-222216 make proposals on nickel hydroxide in which divalent or trivalent Mn is dissolved to form a solid solution. However, these proposals cannot still provide a utilization factor of active materials which is far higher than 110% (1.1 in terms of the number of electrons participating in reaction for Ni).

On the other hand, JP-A-8-225328 proposes to dissolve trivalent Mn in nickel hydroxide to form solid solution, thereby making it possible to perform charging and discharging of more than one-electron reaction. U.S. Pat. No. 5,348,822 also proposes a technique to make it possible to perform charging and discharging of more than one-electron reaction. According to these proposals, charging and discharging of more than one-electron reaction become possible by stabilizing the reaction between $\alpha$-Ni(OH)$_2$ and $\gamma$-NiOOH. The $\alpha$-Ni(OH)$_2$ used there is very low in its density, and improvement of capacity density (capacity per unit volume) of electrode is very difficult. Thus, these proposals are considered to be low in practical value.

In the above conventional nickel hydroxide (positive electrode active material for alkaline storage batteries), there is yet room for improvement on capacity density, utilization factor and others. That is, in conventional active materials, the number of electrons participating in reaction for nickel is basically 1 to 1.1, and even those which perform the charging and discharging reaction exceeding the above number of electrons cannot be improved in capacity density (capacity per unit volume) because of low density of active materials per se. Thus, conventional active materials have not sufficiently contributed to increase the capacity of batteries, which is always demanded by the market for using them as electric sources of portable apparatuses.

SUMMARY OF THE INVENTION

The present invention has been accomplished as a result of research and investigation for active materials of good characteristics in an attempt to solve the above problems in positive electrode active materials for alkaline storage batteries, and the object of the present invention is to provide a positive electrode active material for alkaline storage batteries which is high in capacity density by increasing the number of electrons participating in reaction for nickel hydroxide.

A $\beta$-Ni(OH)$_2$ type nickel oxide (including hydroxide) containing Mn in the state of solid solution or coprecipitated state, and an average valence of Mn being 3.3 valences or more, is used as the positive electrode active material of alkaline storage batteries. Mn content is preferably 1–12% in atomic ratio based on the total of metallic elements, and the average valence of Mn is preferably 3.5–4.0 valences.

Details of the mechanism are not clear, but it is considered that when nickel hydroxide of positive electrode contains Mn in the state of solid solution or coprecipitated state with the average valence of Mn being 3.3 valences or more, preferably with Mn content being 1–12% in atomic ratio based on the total metal elements, conductivity of active material and proton diffusion rate increase and nickel in nickel hydroxide is oxidized (i.e., charged) to a high oxidation state ($\gamma$-NiOOH) exceeding 3 valences, and the active material can be further easily discharged.

DESCRIPTION OF THE PREFERRED EMBODIMENT

Figure 1:
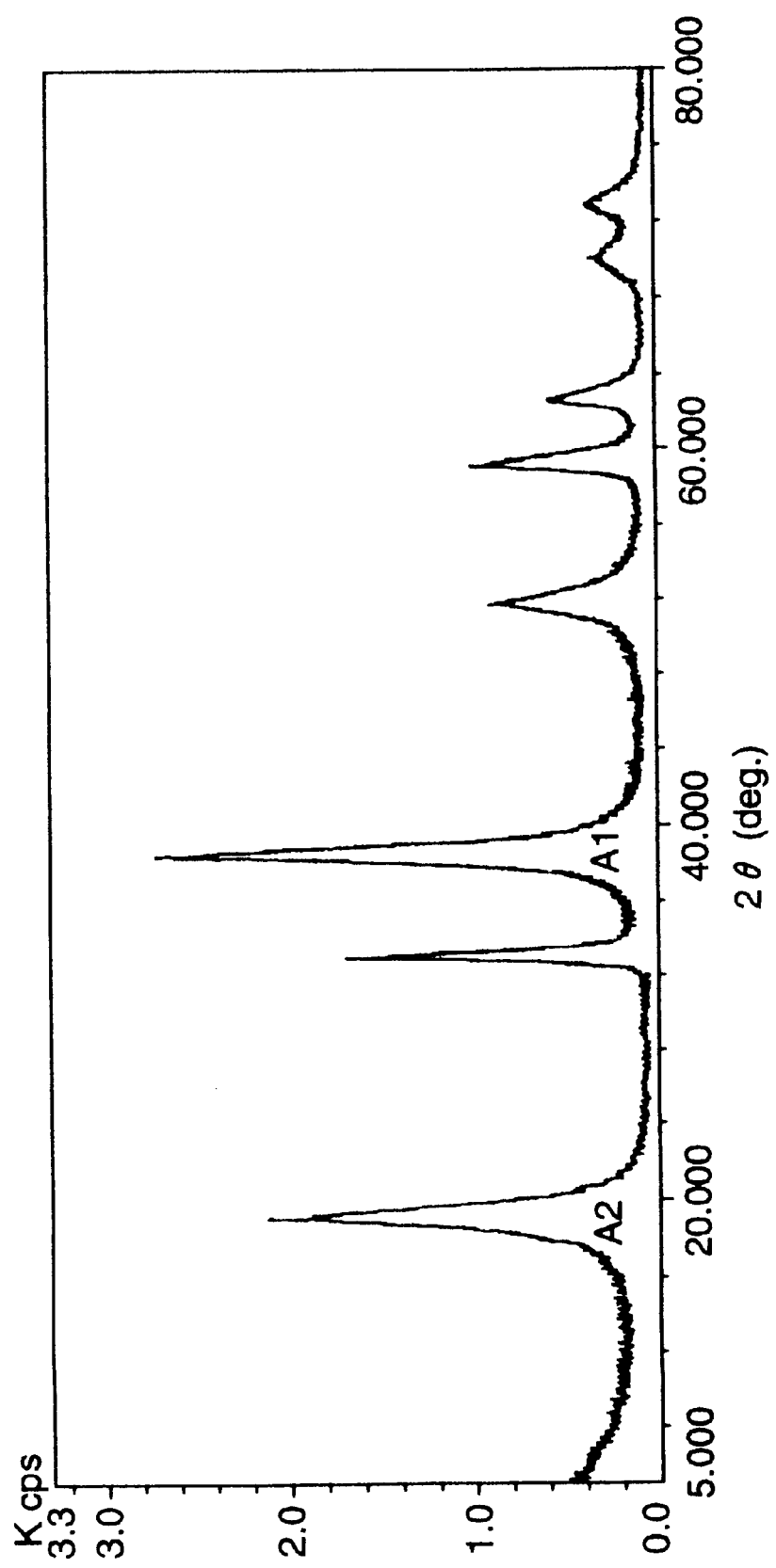
FIG. 1 is a powder X-ray diffraction chart showing the structure of active material A in Examples of the present invention.

The embodiments of the present invention will be explained below.

The first embodiment of the present invention is a β-Ni(OH)$_2$ type nickel oxide (including hydroxide) containing Mn in the state of solid solution or coprecipitated state, the average valence of Mn being 3.3 valences or more. By using such active material, the number of electrons participating in reaction of Ni is improved and an alkaline storage battery of high capacity density can be provided.

The second embodiment of the present invention is a β-Ni(OH)$_2$ type nickel oxide (including hydroxide) containing Mn in the state of solid solution or coprecipitated state, the average valence of Mn being 3.3 valences or more, and the ratio A2/A1 being 1.25 or less which is a ratio of integrated intensity A2 of a peak present at $2\theta=18-21°$ to integrated intensity A1 of a peak present at $2\theta=37-40°$ of powder X-ray diffraction using CuKα ray. By using such active material, the number of electrons participating in reaction of Ni is improved and an alkaline storage battery of high capacity density can be provided.

The third embodiment of the present invention is a β-Ni(OH)$_2$ type nickel oxide (including hydroxide) containing Mn in the state of solid solution or coprecipitated state, the average valence of Mn being 3.3 valences or more, and a β-Ni(OH)$_2$ type nickel oxide (including hydroxide) containing Mn in the state of solid solution or coprecipitated state, the average valence of Mn being 3.3 valences or more, and the ratio A2/A1 being 1.25 or less which is a ratio of integrated intensity A2 of a peak present at $2\theta=18-21°$ to integrated intensity A1 of a peak present at $2\theta=37-40°$ of powder X-ray diffraction using CuKα ray, wherein the amount of Mn contained in the state of solid solution or coprecipitated state is 1–12% in atomic ratio based on the total of metallic elements. By using such active material, the number of electrons participating in reaction of Ni in the active material is 1.1 or more.

The fourth embodiment of the present invention is the active material wherein the average valence of Mn is 3.5–4.0, whereby the number of electrons participating in reaction of Ni in the active material becomes 1.2 or more.

The fifth embodiment of the present invention is the active material which is powder having the shape of a sphere or a shape similar to that of a sphere. By using such active material the, contact state between particles is improved and the particles are uniformly packed, resulting in uniform distribution of electrolyte and thus the electrochemical reaction proceeds satisfactorily.

The sixth embodiment of the present invention is the battery using the active material as described above.

In the following examples, explanation is made of a nickel-metal hydride storage battery using a hydrogen-storing alloy as a negative electrode. The composition of the hydrogen-storing alloy of the negative electrode is not limited, and any of AB$_5$ alloys, AB$_2$ alloys and other hydrogen-storing materials may be used. Moreover, the negative electrode is not limited to hydrogen-storing materials, and Cd negative electrode and Zn negative electrode may also be used. Of course, the batteries are not necessarily small-sized cylindrical batteries, but may be rectangular or large-sized batteries.

In the following examples, explanation is made of using foamed nickel as a plaque of positive electrode, but the plaque is not necessarily a foamed nickel, but may be a three-dimensional porous body such as nickel felt, a punched metal or the like. Additives, binders and conductive agents are also not necessarily those used in the examples and other materials may be successfully used.

The present invention will be explained in more detail by the following examples.

EXAMPLE 1

First, preparation of active material will be explained. A mixed aqueous solution (solution A) of nickel sulfate, manganese sulfate and hydrogen peroxide at a molar ratio of Ni:Mn:H$_2$O$_2$=9:1:5 was prepared. An aqueous sodium hydroxide solution of 5.52 mol/l (solution B) and an aqueous ammonia solution (solution C) of 4.8 mol/l were prepared, respectively. Solutions A, B and C were continuously fed to a reaction vessel filled with distilled water and kept at about 50° C. The feeding rate of the solutions was controlled so that pH in the reaction vessel was stabilized at 11–13, and stirring was carried out to mix the fed solutions uniformly. A magma circulation type reaction vessel was employed as the reaction vessel in order that the aqueous solutions of metal salts and the aqueous alkaline solution were continuously reacted with each other and the resulting precipitate was continuously classified. The resulting precipitate was washed with water and vacuum dried to obtain a positive electrode active material. This positive electrode active material was nearly spherical. This active material is called the present active material A. It was confirmed by ICP emission spectrochemical analysis that the resulting active material (uncharged state) had Ni:Mn=9:1 (atomic ratio).

Furthermore, according to powder X-ray diffraction using CuKα ray, it is assumed that Mn was dissolved in nickel hydroxide in the state of solid solution since the active material showed β-Ni(OH)$_2$ type structure, no diffraction pattern attributable to impurities was observed, and the diffraction pattern somewhat shifted to the great angle side than nickel hydroxide containing no Mn, as shown in FIG. 1. The ratio A2/A1 of integrated intensity A2 of a peak (attributed to plane 001 of β-Ni(OH)$_2$) present at $2\theta=18-21$ to integrated intensity A1 of a peak (attributed to plane 101 of β-Ni(OH)$_2$) present at $2\theta=37-40$: was about 1.

The valence of Mn in the resulting active material was measured by iodometry to obtain an average valence of 3.8.

Then, batteries were produced using this active material. First, this active material, cobalt hydroxide and yttrium oxide were mixed at a weight ratio of 100:11:2. Water was added to the mixture and this was kneaded. Then, a known foamed nickel plaque was filled with the kneaded product, dried and rolled. This was cut to 39 mm wide and 80 mm long and fitted with a current collecting lead to obtain a positive electrode. This positive electrode, a hydrogen-storing alloy negative electrode comprising an Ni plated punched metal plaque coated with a hydrogen-storing alloy powder having a composition of MmNi$_{3.55}$Co$_{0.75}$Mn$_{0.4}$Al$_{0.3}$ together with carboxymethylcellulose, SBR, etc. as binders, and a polypropylene nonwoven fabric separator rendered hydrophilic were combined and rolled, and put in a container of AA size. In this container was poured 2.2 cc of an aqueous potassium hydroxide solution of 10 mol/l saturated with lithium hydroxide as an electrolyte, and the container was sealed to obtain the present battery A according to the present invention.

Moreover, a battery produced using a conventional active material was produced for comparison of characteristics of batteries. That is, a conventional battery B was produced in the same manner as above, except that the positive electrode active material did not contain Mn, but contained Co and Zn in the state of solid solution and was almost spherical (called conventional active material B).

The amount of Ni in the positive electrode positive materials A and B used in these batteries was 2.6 g in terms of metal for 1 cell.

Figure 2:
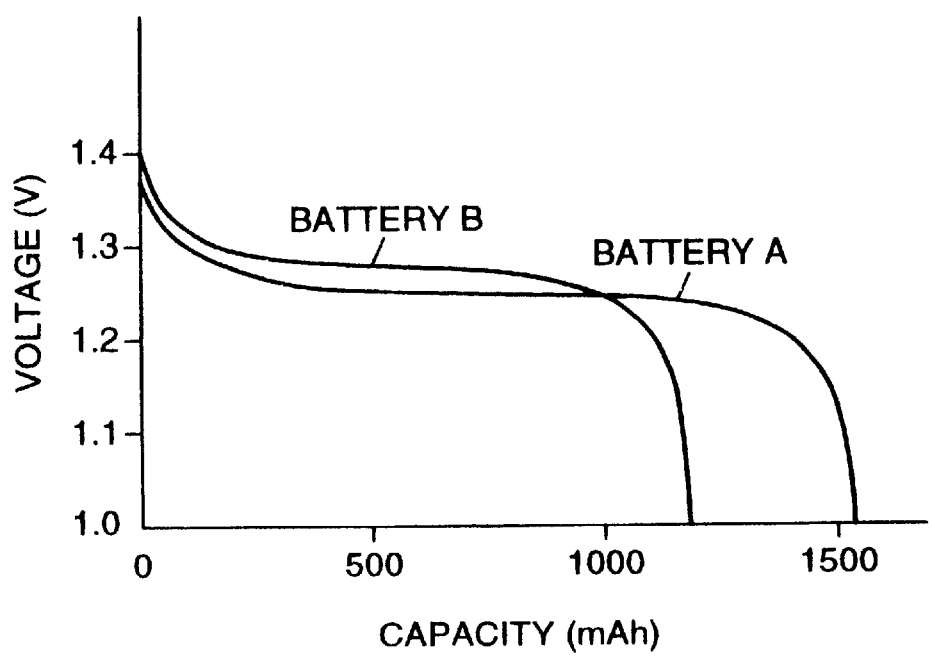
FIG. 2 shows discharge curves showing discharge capacity of battery A in Examples of the present invention and conventional battery B.

Batteries A and B were evaluated by charge and discharge test. They were charged at 150 mA for 15 hours and discharged at 300 mA until the cut-off voltage of discharge of 1.0 V at an atmospheric temperature of 20° C. The results are shown in FIG. 2. Battery B produced using conventional active material B had a discharge capacity of 1180 mAh while battery A produced using the present active material A had a greater discharge capacity of 1540 mAh. When the resulting capacity was shown in terms of the number of electrons participating in reaction of Ni, it was about 1.3 electrons for battery A and about 1.0 electron for battery B. Batteries A and B in charged state were disassembled, and when the positive electrode plate was analyzed by powder X-ray diffraction method, diffraction pattern attributable to γ-NiOOH type structure was not observed for the conventional battery B while diffraction pattern attributable to γ-NiOOH type structure was very strongly observed for the present battery A. From the results, it was concluded that when the present active material A was used, since Ni was easily oxidized up to a high valence and this was discharged, the discharge capacity was enhanced.

EXAMPLE 2

Figure 3:
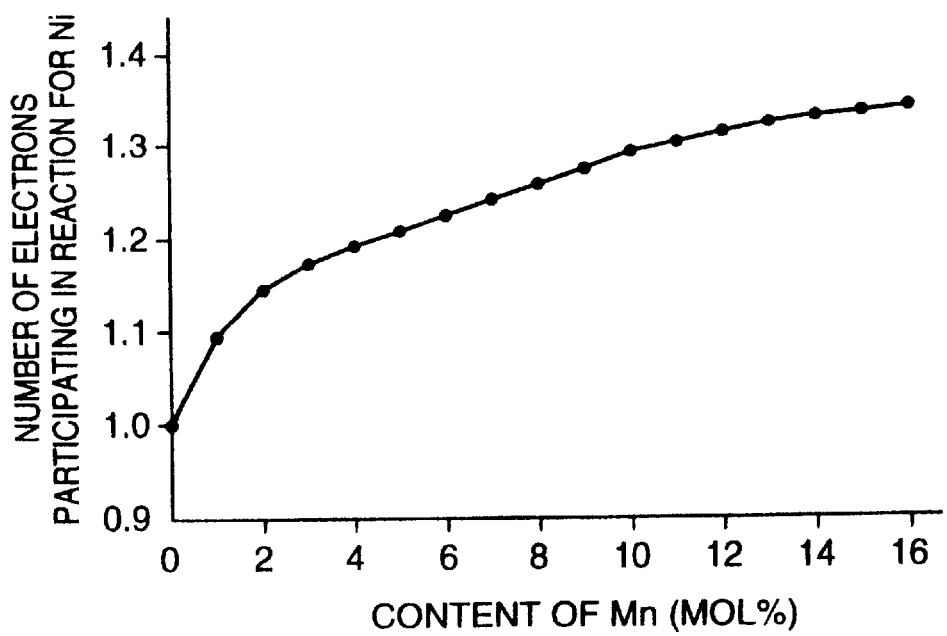
FIG. 3 is a graph showing relation between the Mn content in the active material prepared in the same manner as for battery A in Examples of the present invention and the number of electrons participating in reaction in a sealed battery.

Next, the optimum value of the amount of Mn dissolved in the state of solid solution was examined. Similarly, evaluation was conducted on batteries having active materials prepared in the same manner as of the active material A with changing content of Mn within the range of from 0% to 16% in atomic ratio based on the total of metallic elements. The active material of 10% in Mn content corresponds to the active material A of Example 1. The results are shown in FIG. 3. When the Mn content was 1% or more, the average number of electrons in reaction was 1.1 or more. When the Mn content exceeded 12%, the number of electrons in reaction further increased, but the electrode swelled and the practical value deteriorated. It is considered that this is because γ-NiOOH type structure was further stabilized due to the increase of the amount of Mn dissolved in the state of solid solution. From the above results, the amount of Mn dissolved in the state of solid solution is preferably 1–12%.

Figure 4:
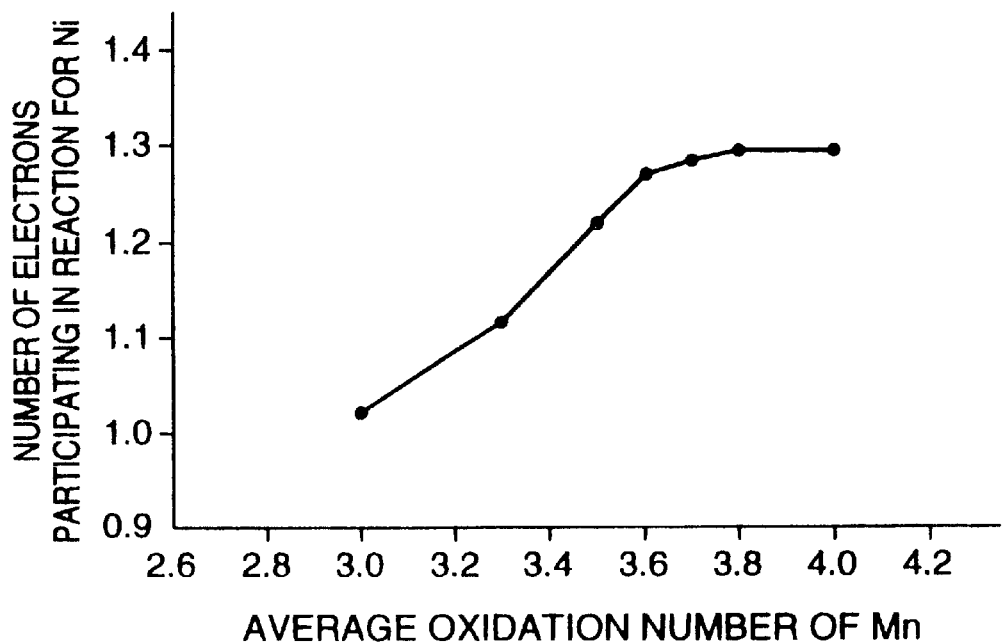
FIG. 4 is a graph showing relation between the average valence of Mn of the active material prepared in the same manner as for battery A in Examples of the present invention and the number of electrons participating in reaction in a sealed battery.

Next, investigation was conducted on the average valence of Mn. Similarly, evaluation was conducted on batteries having active materials prepared in the same manner as of the active material A with changing the average valence of Mn by changing amount of hydrogen peroxide in solution A. The results are shown in FIG. 4. Good results of the number of electrons in reaction of 1.1 or more were obtained when the valence of Mn is 3.3 or more. Moreover, the good results of the number of electrons participating in reaction of 1.2 or more were obtained in the range of valence of Mn of 3.5–4.0 valences.

EXAMPLE 3

Next, the shape of the active material powder was examined.

First, preparation of active material will be explained. One liter of the solution A of Example 1 was taken in a beaker, and one liter of the solution B of Example 1 and one liter of the solution C of Example 1 were added dropwise to the solution A in the beaker kept at 50° C. with stirring. The resulting precipitate was washed with water and vacuum dried to obtain an active material. This was observed by an electron microscope to find that the active material was an agglomerate of fine particles, and the particles individually differed in their shape and were not spherical. This active material is called the present active material C.

Figure 5:
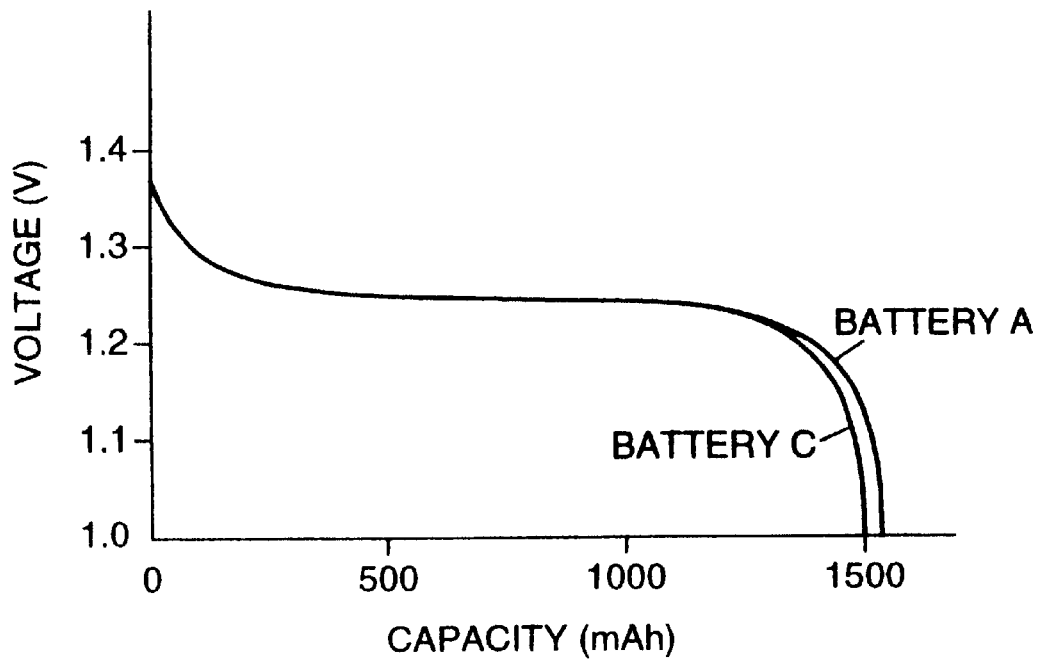
FIG. 5 shows discharge curves showing discharge capacity of active materials A and C in Examples.

Next, the present active material C was compared with the active material A of Example 1. The comparison was made by evaluating sealed batteries in the same manner as in Example 1. The results are shown in FIG. 5. Both the present active materials A and C gave good results in the evaluation on sealed batteries, but the present active material A showed somewhat greater capacity than the present active material C. The reason is not clear, but it is assumed that since the active material A comprised spherical particles, the particles satisfactorily contacted with each other at the time of packing of the particles in the foamed nickel plaque and besides, the particles were uniformly packed, and, as a result, the electrolyte was uniformly distributed and electrochemical reaction satisfactorily proceeded. Furthermore, when bulk density was measured, the bulk density of active material C was smaller by about 20% than active material A. This shows that the active material A is more advantageous in packing of active material in a limited volume. From the above results, it can be seen that in order to sufficiently exhibit the performance of active materials of the present invention, in the case of the active material being a powder, the particles preferably have a spherical, or similar, shape.

EXAMPLE 4

Results of investigation on the structure of active material are shown here. An active material was prepared in the same manner as in Example 1, except that in place of the solution A, the preparation employed a mixed aqueous solution (solution AA) of nickel sulfate, manganese sulfate, hydrogen peroxide and phosphoric acid at a molar ratio of Ni:Mn:$H_2O_2$:$H_3PO_4$=9:1:5:1. The resulting active material showed a structure similar to α-Ni(OH)$_2$ type in measurement by powder X-ray diffraction method and had a very low bulk density of about 50% of that of the active material A. This shows that the active material prepared by the above method (active material having a structure similar to α-Ni(OH)$_2$ type) is very disadvantageous in terms of the packing of it in a limited volume. It is considered that this is because the true density of the active material having a structure similar to α-Ni(OH)$_2$ type is lower than that of the active material having β-Ni(OH)$_2$ type structure. From the above results, it is clear that β-Ni(OH)$_2$ type is preferred as the structure of active materials.

EXAMPLE 5

The ratio A2/A1 of integrated intensity A2 of a peak (attributable to plane 001 of β-Ni(OH)$_2$) present at 2θ=18–21 to integrated intensity A1 of a peak (attributable to plane 101 of β-Ni(OH)$_2$) present at 2θ=37–40 of active materials in X-ray diffraction using CuKα ray will be explained here.

An active material was prepared in the same manner as in preparation of active material A, except that the temperature was changed to the range of 20–80° C. The resulting positive electrode active material comprised almost spherical particles. It was confirmed that the resulting active material had Ni:Mn=9:1 (atomic ratio) according to ICP emission spectrochemical analysis. Furthermore, from the results that the active material had a β-Ni(OH)$_2$) type structure according to the X-ray diffraction using CuKα ray and no diffraction pattern attributable to impurities was observed, and the diffraction pattern shifted to somewhat great angle side than that of nickel hydroxide containing no Mn, it was assumed that Mn was dissolved in nickel hydroxide to form a solid solution.

The ratio A2/A1 of integrated intensity A2 of a peak present at 2θ=18–21 to integrated intensity A1 of a peak present at 2θ=37–40° changed within the range of 0.9–1.3. When the valence of Mn in the resulting active material was measured by iodometry method, the average valence was all in the range of 3.7–3.8. The resulting active material was evaluated in the same manner as in Example 1.

Figure 6:
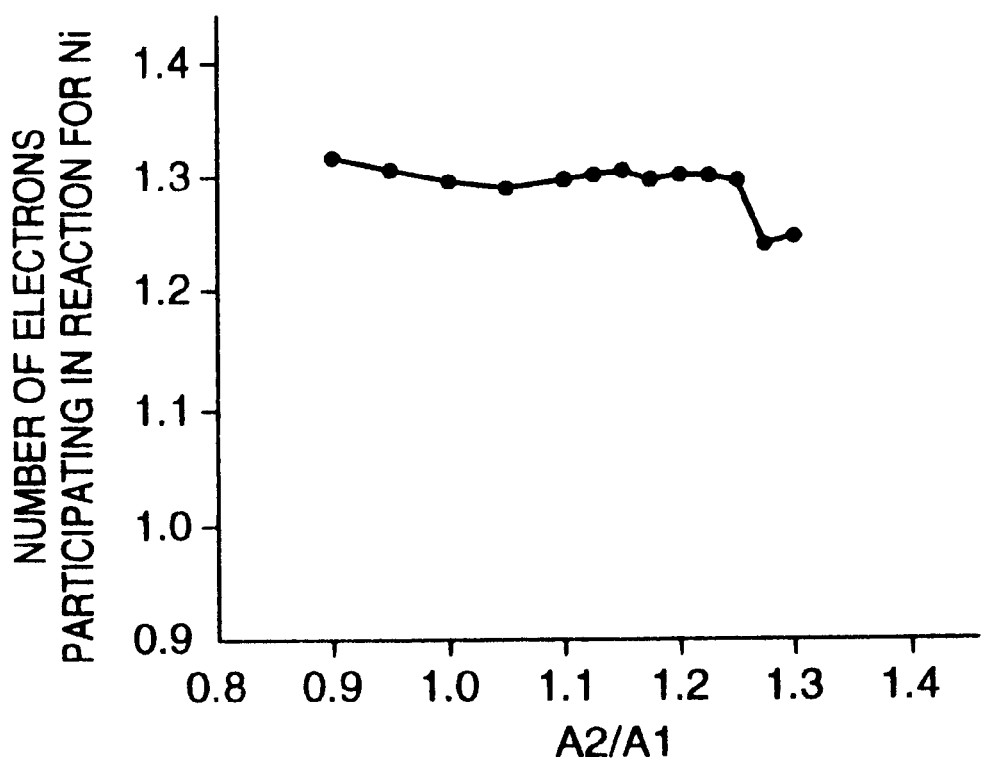
FIG. 6 is a graph which shows relation between the ratio A2/A1 of integrated intensity A2 of a peak present at $2\theta=18-21°$ to integrated intensity A1 of a peak present at $2\theta=37-40°$ of powder X-ray diffraction using CuKα ray for the active material prepared in the same manner as for battery A according to the Examples of the present invention and the number of electrons in reaction in a sealed battery.

FIG. 6 shows the relation between A2/A1 and the number of electrons in reaction of Ni. When A2/A1 was greater than 1.25, the number of electrons participating in reaction was smaller than 1.3 while when A2/A1 was 1.25 or smaller, the number of electrons participating in reaction was generally 1.3–1.32. Thus, it has become clear that good active materials can be obtained by controlling the value of A2/A1 to 1.25 or smaller.

In the above examples, the metallic elements contained in active materials were only Ni and Mn, but generally good results were obtained when the active materials contained additive elements such as Co, Zn, Y, Ca and the like or impurity elements such as Al, rare earth elements, Cu, Zr, V, Cr, Mg, Ti and the like. Furthermore, in the examples, nickel-metal hydride batteries were manufactured as experimental samples, but the active materials of the present invention can also be applied to nickel-cadmium storage batteries, nickel-zinc storage batteries and others to obtain superior results. This is because the present invention is directed to active materials of nickel electrodes which are used for these alkaline storage batteries in common. It is a matter of course that in application of the present invention to nickel-metal hydride storage batteries, good results were also obtained by using other materials than the hydrogen-storing alloys and separators used in the above examples. Although the present invention relates to an active material, as for the substrates supporting the active material, there is no necessity to use a foamed nickel substrate, and good results can be obtained using a positive electrode made by holding a sintered substrate in a reaction vessel and precipitating the active material on the sintered substrate, a positive electrode made by dipping a sintered substrate in a metal salt solution and then dipping it in an alkaline solution to precipitate the active material on the substrate, or a positive electrode made by coating the active material on a Ni plated perforated substrate.

As explained above, according to the present invention, a positive electrode active material for alkaline storage batteries which has a high capacity density and a high practical value is obtained when the active material is mainly composed of β-Ni(OH)$_2$ type nickel oxide (including hydroxide) and has Mn in the state of solid solution or coprecipitated state and an average valence of Mn of 3.3 valences or more, and preferably has an Mn content of 1–12% in atomic ratio based on the total of metallic elements.

Furthermore, a positive electrode active material for alkaline storage batteries which has a high capacity density is obtained when the active material is a β-Ni(OH)$_2$ type nickel oxide (including hydroxide) containing Mn in the state of solid solution or coprecipitated state and an average valence of Mn of 3.3 valences or more, and preferably has an Mn content of 1–12% in atomic ratio based on the total of metallic elements, and has a ratio A2/A1 of 1.25 or less which is a ratio of integrated intensity A2 of a peak present at 2θ=18–21 to integrated intensity A1 of a peak present at 2θ=37–40 in X-ray diffraction using CuKα ray.

What is claimed is:

1. A positive electrode active material for alkaline storage batteries comprising a β-Ni(OH)$_2$ type nickel oxide or nickel hydroxide containing Mn in the state of solid solution or coprecipitated state, and wherein an average valence of Mn is 3.3 valences or more.

2. A positive electrode active material for alkaline storage batteries according to claim 1, wherein the amount of Mn contained in the state of solid solution or coprecipitated state is 1–12% in atomic ratio based on the total of metallic elements.

3. An alkaline storage battery which comprises a nickel positive electrode, a negative electrode, an alkaline electrolyte and a separator, wherein an active material of the nickel positive electrode is a material defined in claim 2.

4. A positive electrode active material for alkaline storage batteries according to claim 1, wherein the average valence of Mn contained in the state of solid solution or coprecipitated state is 3.5–4.0 valences.

5. An alkaline storage battery which comprises a nickel positive electrode, a negative electrode, an alkaline electrolyte and a separator, wherein an active material of the nickel positive electrode is a material defined in claim 4.

6. A positive electrode active material for alkaline storage batteries according to claim 4, wherein a number of electrons participating in the reaction of Ni in the active material is 1.2 or more.

7. A positive electrode active material for alkaline storage batteries according to claim 1 which comprises particles having a spherical or approximately spherical shape.

8. An alkaline storage battery which comprises a nickel positive electrode, a negative electrode, an alkaline electrolyte and a separator, wherein an active material of the nickel positive electrode is a material defined in claim 7.

9. An alkaline storage battery which comprises a nickel positive electrode, a negative electrode, an alkaline electrolyte and a separator, wherein an active material of the nickel positive electrode is a material defined in claim 1.

10. A positive electrode active material for alkaline storage batteries according to claim 1, wherein a number of electrons participating in the reaction of Ni in the active material is 1.1 or more.

11. A positive electrode active material for alkaline storage batteries comprising a β-Ni(OH)$_2$ type nickel oxide or nickel hydroxide containing Mn in the state of solid solution or coprecipitated state, wherein an average valence of Mn is 3.3 valences or more, and a ratio A2/A1 of integrated intensity A2 of a peak present at 2θ=18–21° to integrated intensity A1 of a peak present at 2θ=37–40° of powder X-ray diffraction using CuKα ray is 1.25 or less.

12. A positive electrode active material for alkaline storage batteries according to claim 11, wherein the amount of Mn contained in the state of solid solution or coprecipitated state is 1–12% in atomic ratio based on the total of metallic elements.

13. An alkaline storage battery which comprises a nickel positive electrode, a negative electrode, an alkaline electrolyte and a separator, wherein an active material of the nickel positive electrode is a material defined in claim 12.

14. A positive electrode active material for alkaline storage batteries according to claim 11, wherein the average valence of Mn contained in the state of solid solution or coprecipitated state is 3.5–4.0 valences.

15. An alkaline storage battery which comprises a nickel positive electrode, a negative electrode, an alkaline electrolyte and a separator, wherein an active material of the nickel positive electrode is a material defined in claim 14.

16. A positive electrode active material for alkaline storage batteries according to claim 11 which comprises particles having a spherical or approximately spherical shape.

17. An alkaline storage battery which comprises a nickel positive electrode, a negative electrode, an alkaline electrolyte and a separator, wherein an active material of the nickel positive electrode is a material defined in claim 16.

18. An alkaline storage battery which comprises a nickel positive electrode, a negative electrode, an alkaline electrolyte and a separator, wherein an active material of the nickel positive electrode is a material defined in claim 11.

* * * * *